United States Patent [19]

McElroy et al.

[11] Patent Number: 4,820,212

[45] Date of Patent: Apr. 11, 1989

[54] MARINE PROPULSION DEVICE BEARING LUBRICATION SYSTEM

[75] Inventors: Kennedy K. McElroy, Lindenhurst; Jeffrey P. Higby, Waukegan, both of Ill.; Philip A. Zorc, St. Joseph, Mich.

[73] Assignee: Outboard Marine Corporation, Waukegan, Ill.

[21] Appl. No.: 108,924

[22] Filed: Oct. 15, 1987

[51] Int. Cl.[4] .......................................... B63H 21/10
[52] U.S. Cl. ................................................... 440/88
[58] Field of Search ............... 440/88, 89; 123/196 R, 123/196 W; 184/6.18, 14.1; 417/355; 415/71–74, 76

[56] References Cited

U.S. PATENT DOCUMENTS

| | | | |
|---|---|---|---|
| 1,763,970 | 6/1930 | Johnson | 123/196 W |
| 1,822,573 | 9/1931 | Fitzgerald et al. | 123/196 W |
| 2,569,346 | 9/1951 | Shively | 440/88 |
| 2,691,954 | 10/1954 | Shively | 440/88 |
| 2,963,113 | 10/1957 | Ayling | 184/6.18 |
| 3,298,314 | 1/1967 | Kopczynski | 415/72 |
| 3,428,018 | 2/1969 | Ellzey | 440/88 |
| 3,520,272 | 7/1970 | Ellzey | 440/88 |
| 3,608,684 | 9/1971 | Shimanckas | 192/20 |
| 3,799,291 | 3/1974 | Becker | 440/88 |
| 3,931,783 | 1/1976 | Croisant | 440/88 |
| 4,650,430 | 3/1987 | Schiek | 440/88 |

FOREIGN PATENT DOCUMENTS

222075  8/1968  U.S.S.R. ............................ 184/6.18

*Primary Examiner*—Joseph F. Peters, Jr.
*Assistant Examiner*—Jesûs D. Sotelo
*Attorney, Agent, or Firm*—Michael, Best & Friedrich

[57] ABSTRACT

A marine propulsion device comprising an engine, a lower unit adapted to be mounted on the transom of a boat for pivotal movement relative thereto about a generally vertical steering axis, the lower unit including a lower gearcase having therein lubricant, and a propeller rotatably supported by the lower gearcase, a generally vertical drive shaft rotatably supported in the lower unit and including an upper end driven by the engine, a lower end drivingly connected to the propeller, an axial bore extending upwardly from the lower end and defining a sleeve portion of the drive shaft, and an aperture extending radially through the sleeve portion, and internal threads within the axial bore for pumping lubricant from the lower gearcase upwardly through the axial bore to the aperture so that the lubricant flows outwardly through the aperture.

30 Claims, 1 Drawing Sheet

MARINE PROPULSION DEVICE BEARING LUBRICATION SYSTEM

BACKGROUND OF THE INVENTION

The invention relates to means for lubricating the bearings of a marine propulsion device, and, more particularly, to means for lubricating the bearings supporting the vertical drive shaft of a marine propulsion device.

It is known to use an Archimedean screw on the outside of the vertical drive shaft of a marine propulsion device in order to pump lubricant upwardly to the upper bearings supporting the drive shaft. See, for example, Holtermann U.S. Pat. No. 3,645,360 and Fitz-Gerald U.S. Pat. No. 1,822,573.

Also, Becker U.S. Pat. No. 3,799,291 discloses a vertical drive shaft having therein an axial bore and radial apertures for supplying lubricant to the upper gearcase.

Attention is also directed to the following U.S. patents:

Shively: 2,569,346, Sept. 25, 1951
Shively: 2,691,954, Oct. 19, 1954
Ayling: 2,963,113, Dec. 6, 1960
Ellzey: 3,428,018, Feb. 18, 1969
Ellzey: 3,520,272, July 14, 1970
Shimanckas: 3,608,684, Sept. 28, 1971
Croisant: 3,931,783, Jan. 13, 1976
Schiek: 4,650,430, Mar. 17, 1987

SUMMARY OF THE INVENTION

The invention provides a marine propulsion device comprising an engine, a lower unit adapted to be mounted on the transom of a boat for pivotal movement relative thereto about a generally vertical steering axis, the lower unit including a thrust bearing, a lower gearcase having therein lubricant, and a propeller rotatably supported by the lower gearcase, a generally vertical drive shaft rotatably supported in the lower unit and including an upper end driven by the engine, a lower end drivingly connected to the propeller, an annular, upwardly facing shoulder spaced above the lower end and engaging the thrust bearing so that the thrust bearing prevents axial movement of the drive shaft in the lower unit, an axial bore extending upwardly from the lower end and defining a sleeve portion of the drive shaft, and an aperture extending radially from the bore through the sleeve portion and being aligned with the thrust bearing axially of the drive shaft, and means for pumping lubricant from the lower gearcase upwardly through the axial bore to the aperture so that the lubricant flows outwardly through the aperture to lubricate the thrust bearing.

In one embodiment, the axial bore has therein internal threads, and the pumping means includes the threads.

In one embodiment, the axial bore includes integral internal threads.

In one embodiment, the marine propulsion device further comprises a spring located in the axial bore, and the spring provides the internal threads.

In one embodiment, the marine propulsion device further comprises a radial bearing which is located adjacent the lower end of the drive shaft, which rotatably supports the drive shaft in the lower unit, and which has an upper end, and the internal threads extend below the upper end of the radial bearing.

In one embodiment, the marine propulsion device further comprises sealing means located above the thrust bearing and extending between the lower unit and the drive shaft for preventing the passage of lubricant above the sealing means.

In one embodiment, the drive shaft includes an upper drive shaft segment having an upper end driven by the engine, and a lower end, and a lower drive shaft segment having an upper end driven by the lower end of the upper drive shaft segment, and a lower end drivingly connected to the propeller, and the shoulder is located on the lower drive shaft segment.

In one embodiment, the lower drive shaft segment has therethrough an axial bore having an upper end, the lower end of the upper drive shaft segment is received in the upper end of the axial bore in the lower drive shaft segment and has therein an axial bore communicating with the axial bore in the lower drive shaft segment, the upper end of the lower drive shaft segment includes an annular, generally horizontal surface surrounding the upper drive shaft segment and defining the shoulder, and the radial aperture is located in the upper drive shaft segment and communicates with the axial bore in the upper drive shaft segment.

In one embodiment, the lower end of the upper drive shaft segment is threaded into the upper end the axial bore.

In one embodiment, the lower end of the drive shaft is submerged in the lubricant.

The invention also provides a marine propulsion device comprising an engine, a lower unit adapted to be mounted on the transom of a boat for pivotal movement relative thereto about a generally vertical steering axis, the lower unit including a lower gearcase having therein lubricant, and a propeller rotatably supported by the lower gearcase, a generally vertical drive shaft rotatably supported in the lower unit and including an upper end driven by the engine, a lower end drivingly connected to the propeller, and an axial bore extending upwardly from the lower end and defining a sleeve portion of the drive shaft, and means providing internal threads within the axial bore for pumping lubricant from the lower gearcase upwardly through the axial bore.

A principal feature of the invention is the provision of a marine propulsion device comprising a vertical drive shaft including an axial bore, and a radially extending aperture communicating with the axial bore and being axially aligned with a thrust bearing preventing axial movement of the drive shaft, and means for pumping lubricant from the lower gearcase upwardly through the axial bore to the aperture so that the lubricant flows outwardly through the aperture to lubricate the thrust bearing. Compared to the prior art, this arrangement is a more efficient means for lubricating the thrust bearing because lubricant is supplied to the inside of the thrust bearing rather than to the outside of the thrust bearing. This is more efficient because a thrust bearing naturally acts like miniature oil pump and pumps oil from its inner diameter to its outer diameter. Accordingly, it is more efficient to supply oil to the inside of a thrust bearing than to the outside of a thrust bearing.

Another principal feature of the invention is the provision of a marine propulsion device as described above, wherein the drive shaft is rotatably supported by a radial bearing located below the thrust bearing rather than above the thrust bearing. Because the radial bearing is located below the thrust bearing, lubricant flowing downwardly from the thrust bearing lubricates the radial bearing.

Another principal feature of the invention is the provision of a marine propulsion device comprising a vertical drive shaft including an axial bore, and a radially extending aperture communicating with the axial bore, and means providing internal threads within the axial bore for pumping lubricant from the lower gearcase upwardly through the axial bore to the aperture so that centrifugal force causes the lubricant to flow outwardly through the aperture. Because the threads are located inside the drive shaft, rather than outside the drive shaft, as is known in the art, the threads can extend below the lower radial bearing supporting the drive shaft. This permits oil pumping even when the oil level in the lower gearcase is low, i.e., below the upper end of the lower radial bearing. Preferably, the internal threads are provided by a spring located in the axial bore.

Other features and advantages of the invention will become apparent to those skilled in the art upon review of the following detailed description, claims, and drawings.

Figure 1:
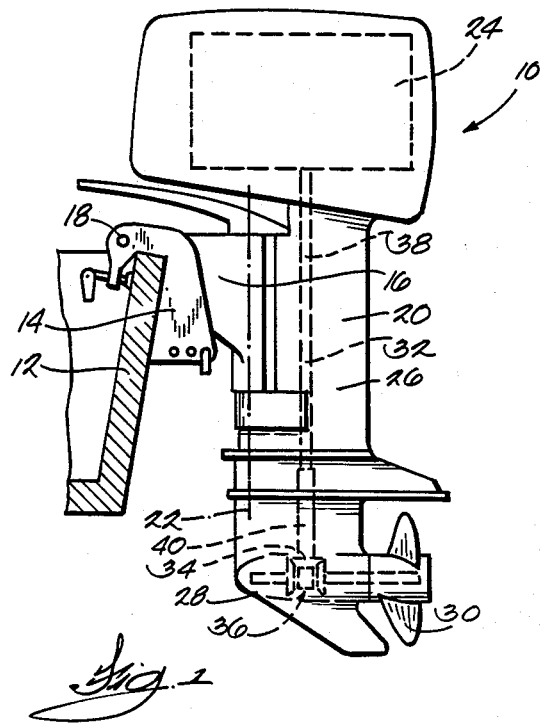
FIG. 1 is a side elevational view of a marine propulsion device embodying the invention

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting

DESCRIPTION OF THE PREFERRED EMBODIMENT

A marine propulsion device 10 embodying the invention is illustrated in the drawings. While the illustrated marine propulsion device is an outboard motor, it should be understood that the invention is also applicable to other types of marine propulsion devices, such as stern drive units As shown in FIG. 1, the marine propulsion device 10 comprises a mounting assembly mounted on the transom 12 of a boat. While various suitable mounting assemblies can be used, in the illustrated construction, the mounting assembly includes a transom bracket 14 fixedly mounted on the transom 12, and a swivel bracket 16 mounted on the transom bracket 14 for pivotal movement relative thereto about a generally horizontal tilt axis 18.

The marine propulsion device 10 also comprises a propulsion unit 20 mounted on the swivel bracket 16 for pivotal movement relative thereto about a generally vertical steering axis 22, and for common movement therewith about the tilt axis 18. The propulsion unit 20 includes an engine 24, and a lower unit 26 supporting the engine 24. The lower unit 26 includes a lower gearcase 28, and a propeller 30 rotatably supported by the lower gearcase 28. The lower gearcase 28 contains lubricant, as is known in the art.

The marine propulsion device 10 also comprises a generally vertical drive shaft 32 rotatably supported in the lower unit 26 and including an upper end driven by the engine 24, and a lower end drivingly connected to the propeller 30. In the preferred embodiment, the lower end of the drive shaft 32 has thereon a drive gear 34 which is drivingly connected to the propeller 30 by a conventional reversible transmission 36.

More particularly, in the preferred embodiment, the drive shaft 32 includes an upper drive shaft segment 38 having an upper end driven by the engine 24, and a lower end, and the drive shaft 32 also includes a lower drive shaft segment 40 having an upper end driven by the lower end of the upper drive shaft segment 38, and a lower end having thereon the drive gear 34. The upper drive shaft segment 38 is preferably made of a corrosion-resistant material such as stainless steel, and the lower drive shaft segment 40 is preferably made of a bearing material such as carbon steel. While the lower end of the upper drive shaft segment 38 can be drivingly connected to the upper end of the lower drive shaft segment 40 by any suitable means, in the preferred embodiment, the lower drive shaft segment 40 has therethrough an axial bore 42 having upper and lower ends, and the lower end of the upper drive shaft segment 38 is threaded into the upper end of axial bore 42. Furthermore, in the preferred embodiment, the drive gear 34 is threaded into the lower end of the axial bore 42 and has therethrough an axial bore 44 communicating with the axial bore 42 in the lower drive shaft segment 40.

Figure 2:
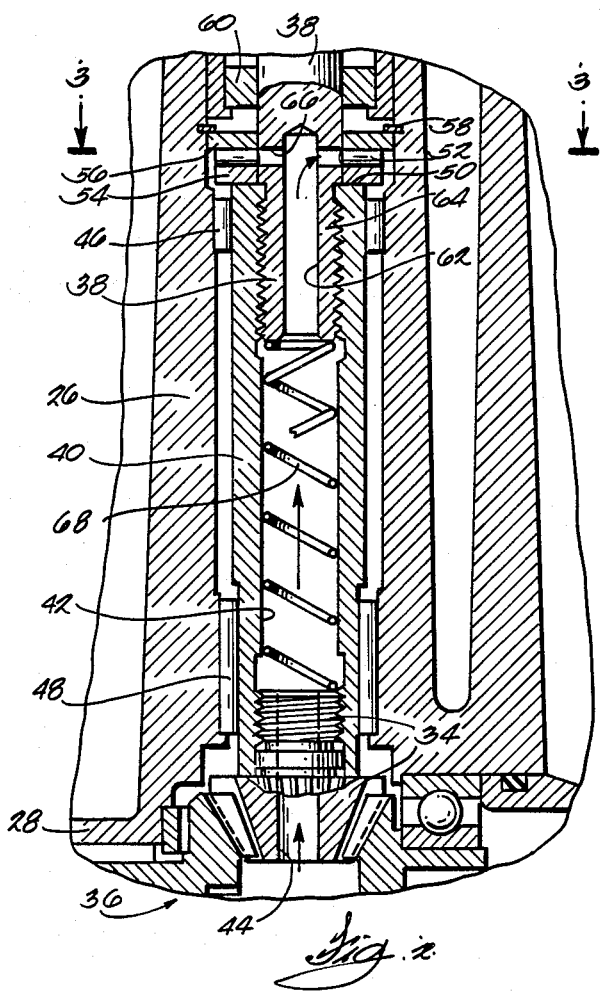
FIG. 2 is a partial, enlarged side elevational view, partially in cross section, of the marine propulsion device.

As shown in FIG. 2, the lower drive shaft segment 40 is supported in the lower unit 26 by first or upper radial bearing 46 located adjacent the upper end of the lower drive shaft segment 40, and by a second or lower radial bearing 48 located adjacent the lower end of the lower drive shaft segment 40. Furthermore, the upper end of the lower drive shaft segment 40 includes an annular, generally horizontal surface surrounding the upper drive shaft segment and defining an annular, upwardly facing shoulder 50, and the lower unit 26 includes a thrust bearing or washer 52 located above the upper radial bearing 46 and engaging the shoulder 50 so that the thrust bearing 52 prevents axially upward movement of the lower drive shaft segment 40 in the lower unit 26. More particularly, as shown in FIG. 2, the thrust bearing 52 engages the shoulder 50 through a lower thrust washer 54, and the thrust bearing 52 is supported in the lower unit 26 by an upper thrust washer 56 which is held in place by a retaining ring 58. Other means for retaining the thrust bearing 52 can be employed and are known in the art.

In the preferred embodiment, the marine propulsion device 10 further comprises sealing means 60 located above the thrust bearing 52 and extending between the lower unit 26 and the upper drive shaft segment 38 for preventing the passage of lubricant above the sealing means 60.

Figure 3:
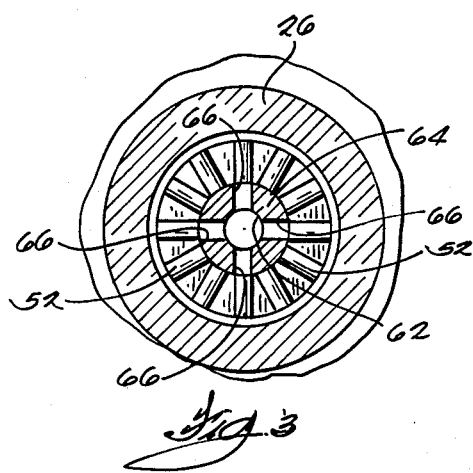
FIG. 3 is a view taken along line 3—3 in FIG. 2.

The marine propulsion device 10 further comprises means for supplying lubricant from the lower gearcase 28 to the thrust bearing 52 and to the upper radial bearing 46. This means includes the axial bore 44 in the drive gear 34 and the axial bore 42 in the lower drive shaft segment 40. This means also includes, in the upper drive shaft segment 38, an axial bore 62 (see FIG. 2) communicating with the axial bore 42 in the lower drive shaft segment 40 and defining a sleeve portion 64 of the upper drive shaft segment 38, and one or more apertures 66 (see FIGS. 2 and 3) extending radially from the bore 42 through the sleeve portion 64 and being aligned with the thrust bearing 52 axially of the drive shaft 32. The lubricant supplying means further includes means for pumping lubricant from the lower gearcase 28 upwardly through the axial bores 44, 42 and 62 to the apertures 66 so that the lubricant flows outwardly through the apertures 66 to lubricate the thrust bearing 52 and the upper radial bearing 46.

While various suitable pumping means can be employed, in the preferred embodiment, the axial bore 42 in the lower drive shaft segment 40 has wherein internal threads, and the pumping means includes the threads. Preferably, the threads extend below the upper end of the lower radial bearing 48. Also, in the preferred embodiment, the threads are provided by a spring 68 located in the axial bore 42 and trapped between the upper end of the drive gear 34 and the lower end of the upper drive shaft segment 38. In alternative embodiments, the threads can be an integral part of the lower drive shaft segment 40, or can be formed on an insert (made of any suitable material) in the bore 42.

When the marine propulsion device 10 is operating, lubricant in the lower gearcase 28 is pumped upwardly through the axial bores 44, 42 and 62 by the spring 68. This is indicated by arrows in FIG. 2. When the lubricant reaches the radially extending apertures 66, the lubricant is pumped outwardly through the apertures 66 either by the forces pumping the lubricant upwardly or by centrifugal force. The lubricant then flows outwardly through the thrust bearing 52 and then downwardly to the upper radial bearing 46. Thus, both the thrust bearing 52 and the upper radial bearing 46 are lubricated.

Various features of the invention are set forth in the following claims.

We claim:

1. A marine propulsion device comprising an engine, a lower unit adapted to be mounted on the transom of a boat for pivotal movement relative thereto about a generally vertical steering axis, said lower unit including a thrust bearing, a lower gearcase having therein lubricant, and a propeller rotatably supported by said lower gearcase, a generally vertical drive shaft rotatably supported in said lower unit and including an upper end driven by said engine, a lower end drivingly connected to said propeller, an annular, upwardly facing shoulder spaced above said lower end and engaging said thrust bearing so that said thrust bearing prevents axial movement of said drive shaft in said lower unit, an axial bore extending upwardly from said lower end and defining a sleeve portion of said drive shaft, and an aperture extending radially from said bore through said sleeve portion and being aligned with said thrust bearing axially of said drive shaft, and means for pumping lubricant from said lower gearcase upwardly through said axial bore to said aperture so that the lubricant flows outwardly through said aperture to lubricate said thrust bearing.

2. A marine propulsion device as set forth in claim 1 wherein said axial bore has therein internal threads, and wherein said pumping means includes said threads.

3. A marine propulsion device as set forth in claim 2 wherein said axial bore includes integral internal threads.

4. A marine propulsion device as set forth in claim 2 and further comprising a spring located in said axial bore, and wherein said spring provides said internal threads.

5. A marine propulsion device as set forth in claim 2 and further comprising a radial bearing which is located adjacent said lower end of said drive shaft, which rotatably supports said drive shaft in said lower unit, and which has an upper end, and wherein said internal threads extend below said upper end of said radial bearing.

6. A marine propulsion device as set forth in claim 1 and further comprising sealing means located above said thrust bearing and extending between said lower unit and said drive shaft for preventing the passage of lubricant above said sealing means.

7. A marine propulsion device as set forth in claim 1 wherein said drive shaft includes an upper drive shaft segment having an upper end driven by said engine, and a lower end, and a lower drive shaft segment having an upper end driven by said lower end of said upper drive shaft segment, and a lower end drivingly connected to said propeller, and wherein said shoulder is located on said lower drive shaft segment.

8. A marine propulsion device as set forth in claim 7 wherein said lower drive shaft segment has therethrough an axial bore having an upper end, wherein said lower end of said upper drive shaft segment is received in said upper end of said axial bore in said lower drive shaft segment and has therein an axial bore communicating with said axial bore in said lower drive shaft segment, wherein said upper end of said lower drive shaft segment includes an annular, generally horizontal surface surrounding said upper drive shaft segment and defining said shoulder, and wherein said radial aperture is located in said upper drive shaft segment and communicates with said axial bore in said upper drive shaft segment.

9. A marine propulsion device as set forth in claim 8 wherein said lower end of said upper drive shaft segment is threaded into said upper end of said axial bore.

10. A marine propulsion device as set forth in claim 7 and further comprising a first radial bearing which is located beneath said thrust bearing and adjacent said upper end of said lower drive shaft segment and which rotatably supports said lower drive shaft segment in said lower unit, and a second radial bearing which is located adjacent said lower end of said lower drive shaft segment and which rotatably supports said lower drive shaft segment in said lower unit.

11. A marine propulsion device as set forth in claim 7 and further comprising sealing means located above said thrust bearing and extending between said lower unit and said upper drive shaft segment for preventing the passage of lubricant above said sealing means.

12. A marine propulsion device as set forth in claim 1 wherein said lower end of said drive shaft is submerged in the lubricant.

13. A marine propulsion device comprising an engine, a lower unit adapted to be mounted on the transom of a boat for pivotal movement relative thereto about a generally vertical steering axis, said lower unit including a thrust bearing, a lower gearcase having therein lubricant, and a propeller rotatably supported by said lower gearcase, a lower drive shaft segment rotatably supported in said lower unit and having an upper end defining an annular, generally horizontal surface engaging said thrust bearing so that said thrust bearing prevents axial movement of said lower drive shaft segment in said lower unit, a lower end drivingly connected to said propeller, and an axial bore extending through said lower drive shaft segment and having an upper end, an upper drive shaft segment rotatably supported in said lower unit coaxially with said lower drive shaft segment and having an upper end driven by said engine, a lower end threaded into said upper end of said axial bore in said lower drive shaft segment, an axial bore communicating with said axial bore in said lower drive shaft segment and defining a sleeve portion of said upper drive shaft segment, and an aperture extending radially from said bore through said sleeve portion and being aligned with said thrust bearing axially of said drive shaft segments, and means for pumping lubricant from said lower gearcase upwardly through said axial bores to said aperture so that the lubricant flows outwardly through said aperture to lubricate said thrust bearing.

14. A marine propulsion device as set forth in claim 13 wherein said axial bore in said lower drive shaft segment has therein internal threads, and wherein said pumping means includes said threads.

15. A marine propulsion device as set forth in claim 14 wherein said axial bore in said lower drive shaft segment includes integral internal threads.

16. A marine propulsion device as set forth in claim 14 and further comprising a spring located in said axial bore in said lower drive shaft segment, and wherein said spring provides said internal threads.

17. A marine propulsion device as set forth in claim 14 and further comprising a radial bearing which is located adjacent said lower end of said lower drive shaft segment, which rotatably supports said lower drive shaft segment in said lower unit, and which has an upper end, and wherein said internal threads extend below said upper end of said radial bearing.

18. A marine propulsion device as set forth in claim 13 and further comprising sealing means located above said thrust bearing and extending between said lower unit and said upper drive shaft segment for preventing the passage of lubricant above said sealing means.

19. A marine propulsion device as set forth in claim 13 and further comprising a first radial bearing which is located beneath said thrust bearing and adjacent said upper end of said lower drive shaft segment and which rotatably supports said lower drive shaft segment in said lower unit, and a second radial bearing which is located adjacent said lower end of said lower drive shaft segment and which rotatably supports said lower drive shaft segment in said lower unit.

20. A marine propulsion device as set forth in claim 13 wherein said lower end of said lower drive shaft segment is submerged in the lubricant.

21. A marine propulsion device comprising an engine, a lower unit adapted to be mounted on the transom of a boat for pivotal movement relative thereto o about a generally vertical steering axis, said lower unit including a lower gearcase having therein lubricant, a generally vertical drive shaft rotatably supported in said lower unit and including an upper end driven by said engine, a lower end extending into said gear case and adapted to be drivingly connected to a propeller, and an axial bore extending upwardly from said lower end, and means providing internal threads within said axial bore for pumping lubricant from said lower gearcase upwardly through said axial bore.

22. A marine propulsion device as set forth in claim 21 wherein said axial bore includes integral internal threads.

23. A marine propulsion device as set forth in claim 21 and further comprising a spring located in said axial bore, and wherein said spring provides said internal threads.

24. A marine propulsion device as set forth in claim 21 and further comprising a radial bearing which is located adjacent said lower end of said drive shaft, which rotatably supports said drive shaft in said lower unit, and which has an upper end, and wherein said internal threads extend below said upper end of said radial bearing.

25. A marine propulsion device as set forth in claim 21 wherein said axial bore defines a sleeve portion, and wherein said drive shaft also includes an aperture extending radially from said bore through said sleeve portion, and wherein said threads pump lubricant to said aperture so that the lubricant flows outwardly through said aperture.

26. A marine propulsion device as set forth in claim 21 wherein said lower end of said drive shaft is submerged in the lubricant.

27. A method of lubricating a thrust bearing on an at least partially hollow, vertical drive shaft having a lower end, an axial bore extending upwardly from the lower end, and an aperture communicating with the bore and located approximately in line with the thrust bearing, said method comprising the step of pumping oil from a reservoir at the lower end of the drive shaft through the bore and through the aperture.

28. A method as set forth in claim 27 wherein said pumping step is performed by an Archimedian screw in the bore.

29. A method as set forth in claim 27 wherein said pumping step is performed by a helical spring in the bore.

30. A method as set forth in claim 27 wherein the bore extends from the lower end of the drive shaft to slightly above the aperture.

* * * * *